United States Patent
Zenger et al.

(10) Patent No.: US 11,262,898 B2
(45) Date of Patent: Mar. 1, 2022

(54) VISUAL CONTEXT IN DATAFLOWS

(71) Applicant: salesforce.com, inc., San Francisco, CA (US)

(72) Inventors: Brittany Zenger, Coquitlam (CA); Daniel Scott Perry, New Westminster, CA (US); James D. Vogt, San Bruno, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/670,717

(22) Filed: Oct. 31, 2019

(65) Prior Publication Data

US 2021/0132777 A1     May 6, 2021

(51) Int. Cl.
    *G06F 3/0484*      (2013.01)
    *G06F 3/04845*      (2022.01)
    *G06F 3/0482*      (2013.01)

(52) U.S. Cl.
    CPC ........ *G06F 3/04845* (2013.01); *G06F 3/0482* (2013.01)

(58) Field of Classification Search
    CPC ............... G06F 8/33–35; G06F 3/0482; G06F 3/04842; G06F 8/34; G06F 16/9024; G06F 3/0484
    See application file for complete search history.

(56) References Cited

U.S. PATENT DOCUMENTS

| | | | |
|---|---|---|---|
| 9,257,986 B2* | 2/2016 | Weber | H03K 19/17736 |
| 2004/0196310 A1* | 10/2004 | Aamodt | G06Q 10/00 715/738 |
| 2012/0221998 A1* | 8/2012 | Rowley | G06F 9/451 717/105 |
| 2014/0282364 A1* | 9/2014 | Woodward | G06F 8/34 717/105 |
| 2019/0095176 A1* | 3/2019 | Larson | G06F 8/34 |
| 2020/0201608 A1* | 6/2020 | Wallbaum | G06F 8/35 |

* cited by examiner

*Primary Examiner* — Mong-Shune Chung
(74) *Attorney, Agent, or Firm* — Sterne, Kessler, Goldstein & Fox P.L.L.C.

(57) ABSTRACT

Disclosed herein are system, method, and device embodiments for implementing visual context in dataflows. A computing device may display a dataflow representation associated with a transformative process, receive selection of an individual node of the dataflow representation, and determine a visual context associated with the individual node based on a data transformation step associated with the individual node. Further, the computing device may determine a plurality of nodes associated with the visual context, and apply a graphical effect to the individual node and the plurality of nodes, the graphical effect modifying an attribute of the individual node and the plurality of nodes.

14 Claims, 4 Drawing Sheets

VISUAL CONTEXT IN DATAFLOWS

BACKGROUND

Some dataflow builders may present graphical user interfaces (GUI) displaying a plurality of dataflow nodes of a dataflow. Often the dataflow nodes are interrelated and provide data to each other (e.g., the dataflow nodes may belong to a directed graph and have ancestor-descendant relationships between each other). For instance, a dataflow node may receive input data downstream from a plurality of other dataflow nodes. As such, an operator of a dataflow builder may want to view the dataflow node and the plurality of other dataflow nodes. However, in some instances, limited display sizes and high amounts of dataflow nodes make it difficult for an operator to simultaneously view a dataflow node of interest and related dataflow nodes, and require an operator to perform cumbersome navigation operations within the GUI to ascertain relationships between dataflow nodes.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

Figure 1A:
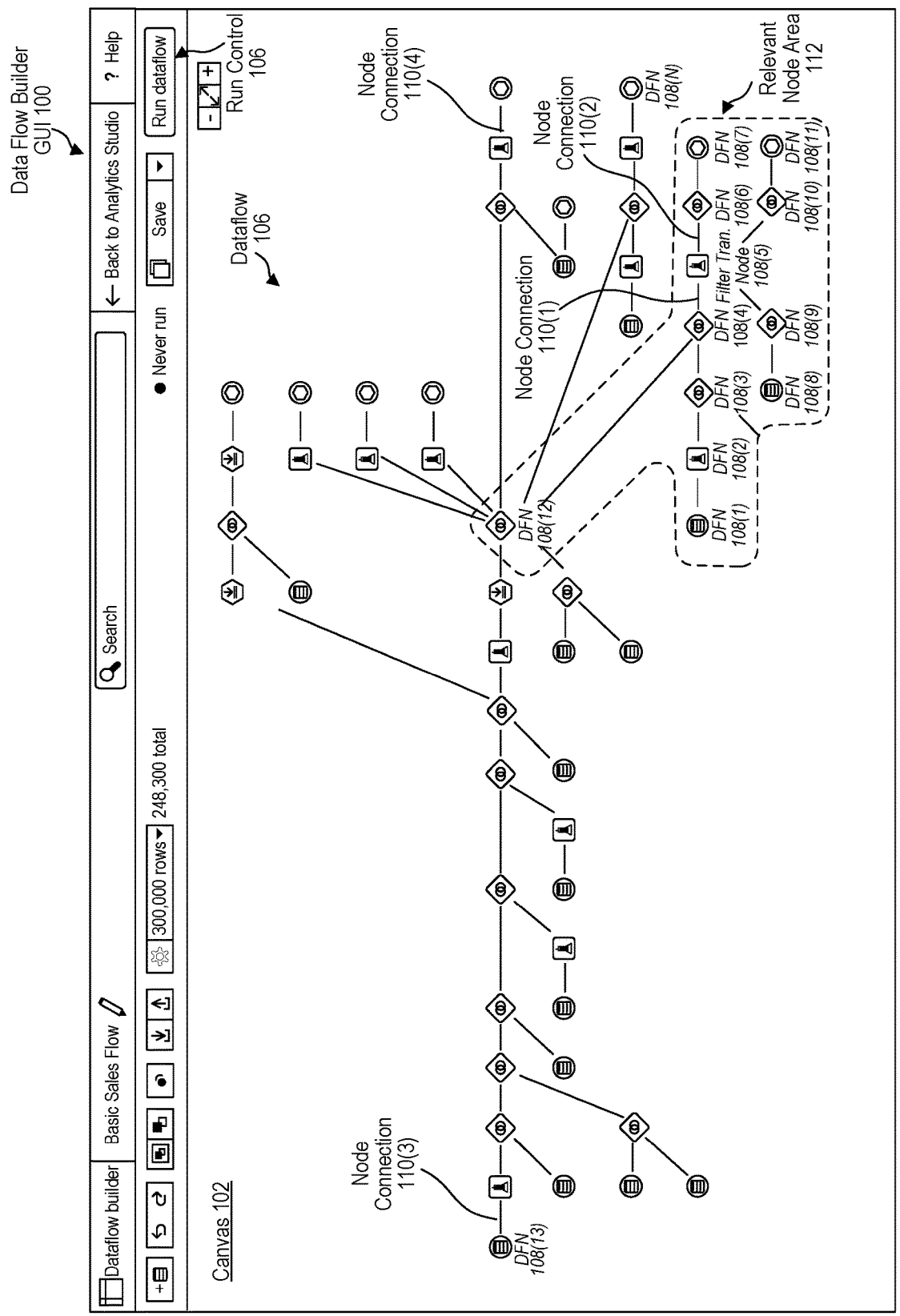
FIGS. 1A-1B is a block diagram of an example framework for implementing visual context in dataflows, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for implementing visual context in dataflows.

Figure 1B:
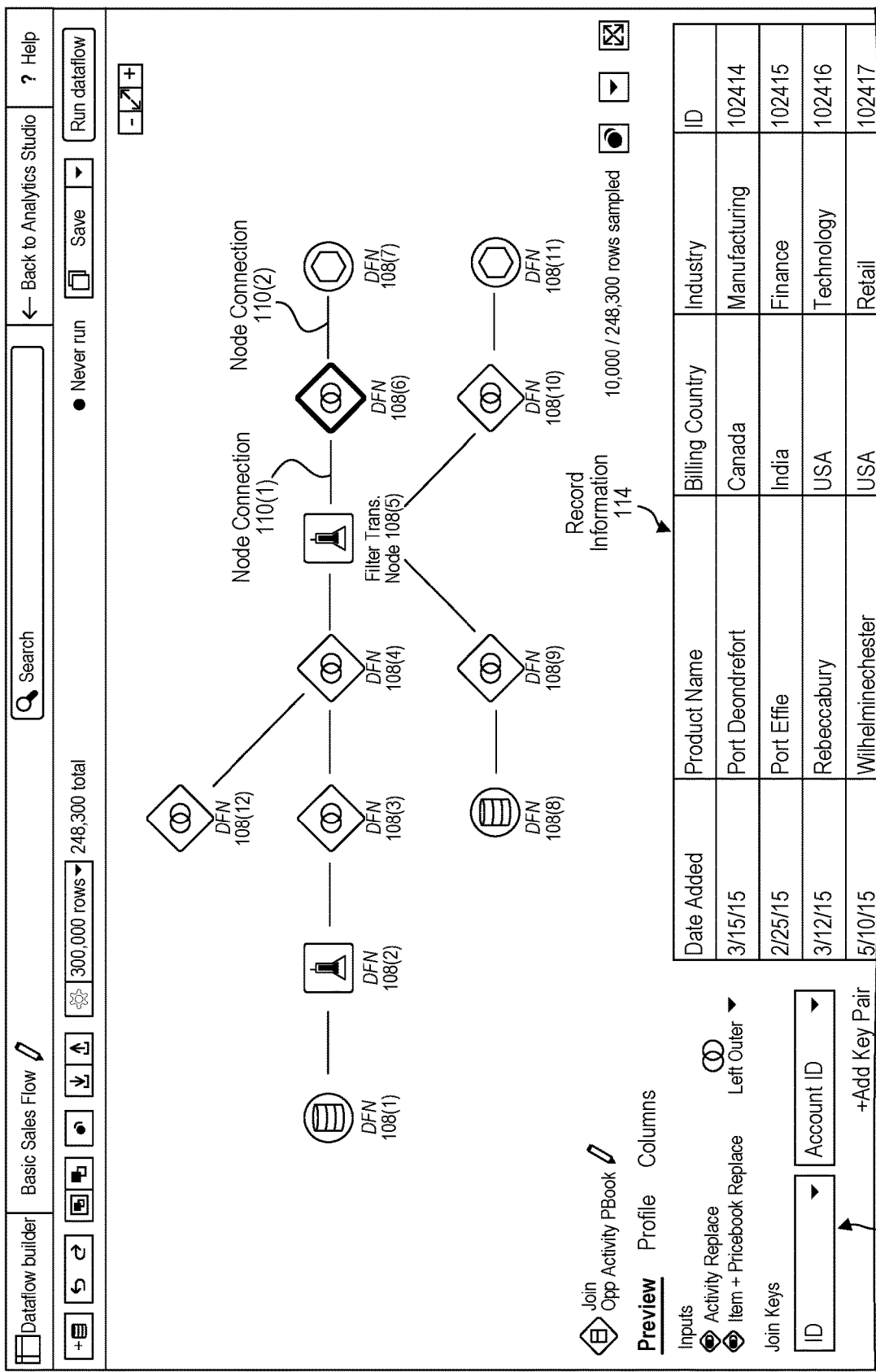

FIGS. 1A-1B illustrate an example graphical user interface for implementing visual context in dataflows, according to embodiments of the present disclosure.

As illustrated in FIG. 1A, a dataflow builder application may present a dataflow builder GUI 100 for declaratively designing a dataflow. The dataflow builder GUI 100 may include a canvas 102 for declaratively designing a dataflow 104, and a run control 106 configured to execute the dataflow defined within the canvas 102. For example, in some embodiments, a designer may declaratively design a transformative process within the flow canvas 102. As used herein, and in some embodiments, "declarative design" may refer to dataflow development via point and click, drag and drop interfaces, configuration wizards, JavaScript Object Notation (JSON), and/or declarative language input (eXtensible Markup Language (XML), YAML Ain't Markup Language (YAML), Extensible Application Markup Language (XAML), or any other markup languages) to text input forms.

For example, the dataflow builder application may permit a designer to drag and drop the dataflow nodes 108(1)-(N) of the dataflow 104 into the canvas 102, and use point and click interaction to create node connections 110(1)-(N) between the dataflow nodes 108(1)-(N) of the dataflow 104. Further, the dataflow builder application may provide interfaces for configuring the dataflow nodes 108 of the dataflow 104 before or after they are added to the dataflow 104 via the canvas 102. As the designer adds the dataflow nodes 108(1)-(N) and node connections 110(1)-(N) to the canvas 102, the dataflow builder application generates an executable configuration file capable of performing the transformative process represented by the dataflow 104. In some embodiments, the run control 106 may be configured to execute the configuration file generated from the dataflow 104.

Further, as used herein, a "dataflow" may refer to a visual representation of a transformative process. In some examples, the transformative process may include a set of instructions that specify data to extract from a data source, methods for transforming data retrieved from the data sources, and data sources to make available via querying methods. Further, the dataflow nodes 108(1)-(N) may correspond to the transformative steps of the transformative process. For instance, a dataflow node 108 of the dataflow 104 may visually represent a transformative step that receives input data, performs a transformation on the input data to determine transformed data, and outputs the transformed data. In some embodiments, the transformative step may receive the input data from at least one other transformative step of the transformative process represented by the dataflow 104, and output the transformed data to at least one other transformative step of the dataflow 104. Further, the input and output to the transformative steps may be visually represented within the canvas 102 as node connections 110(1)-(N). For example, the node connection 110(1) connected to the left side of the dataflow node 108(5) may represent input to the transformative step represented by the filter transformation node 108(5), and the node connection 110(2) connected to the right side of the filter transformation node 108(5) may represent output from the transformative step represented by the filter transformation node 108(5).

As used herein, in some embodiments, a "transformation" may refer to the manipulation of data. Some examples of transformations include an append transformation that combines multiple data sets into a single dataset, an augment transformation that joins multiple datasets for the performance of a query, a compute expression transformation that allows fields derived from an expression to be added to a dataset, a compute relative information that allows fields derived from an expression to be added to a dataset, a delta transformation that calculates changes in the value of a measure column in a dataset over a period of time, a digest transformation that extracts connected data in a dataflow, a dimension-to-measure transformation that creates a new measure based on a dimension and adds the new measure column to the dataset, an edgemart transformation that provides a dataflow access to data source, an export transformation that creates a data file and a schema file from data in the dataflow, a filter transformation that removes records from an existing dataset based on a specified condition, a flatten transformation that flattens hierarchical data, a prediction transformation that analyzes historical data to identify patterns and predict future outcomes, an update transformation that updates the specified field values in an existing dataset based on data from another dataset, etc.

In some embodiments, a dataflow 104 may operate on and produce datasets. As used herein, in some embodiments, a "dataset" may be a collection of related data that is stored in a denormalized, and/or compressed form. In some embodiments, the fields of a dataset may be limited in type. For example, each dataset field may be limited to date, dimension, or measure. The dimension type may be used for qualitative values, and the measure type may be used for quantitative values.

As an example, a designer may endeavor to design the dataflow 104 to collect data corresponding to the performance analytics of a web application, identify trend data based on the collected data, and optimize the web application based on the trend data. Further, identifying the trend data may require collecting web analytics from multiple data sources, transforming the data to dataset formats best suited for revealing possible trends, and transforming the datasets to trend information.

As described above, in order to construct the dataflow 104 to identify trend information, the designer may add the dataflow nodes 108(1)-(N) to the dataflow 104. Further, each dataflow node 108 may perform a programmed function (e.g., a transformative step). For example, the designer may endeavor to optimize website performance when visited by users from a particular geographic location. As such, the designer may add the filter transformation node 108(5) to the dataflow 104. Further, the filter transformation node 108(5) may be configured to receive a dataset including a visitors' log of the website, and filter records outside of the geographic area.

In some instances, the designer may need to navigate the canvas 102 and access different dataflow nodes 108 during the design process or during execution of the dataflow 104. For instance, the dataflow design may need to locate the filter transformation node 108(5) within the canvas 102, select the filter transformation node 108(5), and modify the specified filter condition for the filter transformation node 108(5). However, the designer may need to view other dataflow nodes 108 for reference while configuring the filter transformation node 108(5). For instance, the designer may need information about the data input into the filter and the nodes that will receive the data output from the filter transformation node 108(5).

As an example, referring to FIG. 1, the designer may need to view the dataflow nodes 108 within the relevant node area 112. But a display size of the user interface may restrict the dataflow builder GUI 100 from viewing all of the dataflow nodes 108 within the relevant node area 112. For instance, the designer may be unable to simultaneously view the filter transformation node 108(5) and the dataflow node 108(12) due to their distance from each other within the canvas 102. As such, the designer would be required to perform multiple navigation operations (e.g., scroll, pan, and/or zoom operations) over the dataflow builder GUI 100 to configure the filter transformation node 108(5).

Furthermore, as the number of dataflow nodes 108(1)-(N) of the dataflow 104 increases in size, it would become even more cumbersome to navigate the canvas 102 to find the dataflow nodes 108(1) and 108(12) of interest to the designer, and distinguish between the node connections 110(1)-(2) connected to the filter transformation node 108(5) and the other node connections 110(3)-(N) of the dataflow 104. Accordingly, the dataflow builder application may be configured to determine a visual context of a dataflow node 108(5) selected by a designer, and display the dataflow nodes 108(1)-(12) associated with the visual context within the canvas 102. Consequently, the designer will not be required to perform awkward and cumbersome operations when designing or managing the dataflow 104.

Referring to FIG. 1B, a designer may select the filter transformation node 108(5) of the dataflow 104 within the canvas 102. In response, the dataflow builder application may determine a visual context associated with the filter transformation node 108(5). As referred to herein, a "visual context" may refer to criteria describing dataflow nodes likely to be of interest to a designer when viewing a particular dataflow node (e.g., the dataflow nodes within the relevant node area 112). In some embodiments, the visual context may further include a visual layout for displaying the selected dataflow node and the other dataflow nodes within the relevant area 112. The visual layout may modify the presentation of the dataflow nodes 108(1)-(12) within the relevant area 112. For example, the visual layout may modify the distance between the dataflow nodes 108(1)-(12) within the relevant area 112, re-size the dataflow nodes (1)-(12) within the relevant area 112, or re-align the dataflow nodes (1)-(12) within the relevant area 112.

Once the dataflow builder determines the visual context, the dataflow builder application may determine dataflow nodes matching the criteria. Further, the dataflow builder application may display the selected node and the dataflow nodes matching the criteria in accordance with visual layout within the canvas 102. In some embodiments, the visual layout may be applied as a graphical effect when displaying the selected dataflow node and the other dataflow nodes within the relevant area 112.

In some embodiments, the dataflow builder application may determine the visual context based on at least one of the data transformation step associated with the selected node, an attribute of the data transformation step associated with the selected node, or an attribute of data processed at the data transformation step associated with the selected node. For example, given that filter transformation node 108(5) corresponds to a filter transformation step, the dataflow builder application may determine that the designer would likely be interested in viewing dataflow node 108(1) and dataflow node 108(8) given that the dataflow node 108(1) and the dataflow node 108(8) correspond to data sources with data that is filtered by the filter transformation step. Including the dataflow node 108(1) and the dataflow node 108(8) within the visual context may allow the designer to determine the data that needs to be filtered at the filter transformation step, and the condition for filtering the data without having to perform unnecessary navigation operations within the canvas 102. As another example, if the selected dataflow node 108 receives data input from two other dataflow nodes, the dataflow builder application may determine that that the designer would like be interested in viewing dataflow nodes preceding both of the dataflow nodes that provide data input to the selected data flow node. As yet still another example, if the selected dataflow node 108 receives numerical data, the visual context may include other dataflow nodes that also transform numerical data.

Further, in some embodiments, the dataflow builder application may determine the visual context based on predetermined proximity information. For instance, the visual context may include a predetermined number of dataflow nodes preceding and/or succeeding the filter transformation node 108(5). For example, the dataflow builder application may determine that the dataflow node 108(1) is a member of the visual context based on the visual context including any dataflow nodes less than four degrees away from the filter transformation node 108(5). Further, in some embodiments, the predetermined proximity may be based upon the type of dataflow node. For example, the predetermined proximity may be the five dataflow degrees preceding the selected dataflow node when the selected dataflow node is an export transformation node.

In some embodiments, the dataflow builder application may determine the visual context based on source information or sink information. For instance, the dataflow builder application may determine that the visual context of the filter transformation node 108(5) includes the dataflow nodes belonging to a source-to-sink path including the filter transformation node 108(5). Referring to the FIG. 1B, the source-to-sink path of the filter transformation node 108(5) includes the path from the dataflow node 108(1) and the dataflow node 108(8) (i.e., the source nodes) thru the filter transformation node 108(5) to the dataflow node 108(7) and the dataflow node 108(11) (i.e., the sink nodes).

In some embodiments, the dataflow builder application may determine the visual context based on historic user activity. For instance, the dataflow builder application may track historic designer activity to identify the dataflow nodes that are frequently viewed before, during, or after a designer selects the filter transformation node 108(5) or a dataflow node sharing one or more attributes with the filter transformation node 108(5). Further, the dataflow builder application may determine the visual context based on trends or patterns identified in the historic designer activity. As an example, the dataflow builder application may identify that the historic designer activity indicates that the designer often views data sources within three degrees of the filter transformation node 108(5) after selecting the filter transformation node 108(5). As such, the dataflow builder application may present all of the data sources within threes nodes of the filter transformation node based on the historic designer activity. In some embodiments, the dataflow builder application may employ machine learning techniques and/or pattern recognition techniques to determine the visual context. For instance, the dataflow builder application may utilize hidden Markov models, decision trees, regression models, support vector machines, or artificial neural networks for determining which of the dataflow nodes 108(1)-(N) to present within the canvas in response to selection of a dataflow node of interest. Additionally, in some instances, the historic user activity may include user activity collected with respect to multiple designers.

Further, as described above, once the dataflow builder application has identified the dataflow nodes associated with the visual context, the dataflow builder application may present the identified nodes 108(1)-(12) within the canvas 102 in accordance with a visual layout. For instance, as illustrated in FIG. 1B, in some embodiments, the dataflow builder application may display only the identified dataflow nodes 108(1)-(12) within the canvas 102 based on the visual layout. In some other embodiments, the dataflow builder application may apply graphical effects to the identified dataflow nodes 108(1)-(12) of the visual context or the dataflow nodes 108(13)-(N) not belonging to the visual context. For instance, the dataflow builder application may magnify the size of the identified dataflow nodes 108(1)-(12). Additionally, or alternatively, in some embodiments, the dataflow builder application may minimize the size of the dataflow nodes 108(13)-(N) that are not associated with the visual context. In some other instances, the dataflow builder application may apply focusing or defocusing effects to the dataflow nodes 108(1)-(N). For example, the dataflow builder application may gray out or otherwise reduce the visibility of the dataflow nodes 108(13)-(N) that are not associated with the visual context. In yet still some other embodiments, the dataflow builder application may re-align or re-position the identified dataflow nodes 108(1)-(13) to increase their visibility within the canvas 102

As illustrated in FIG. 1B, the a dataflow builder GUI 100 may further include record information 114 displaying data associated with a selected dataflow node, and a configuration interface for declaratively configuring a transformative step associated with a selected dataflow node.

Figure 2:
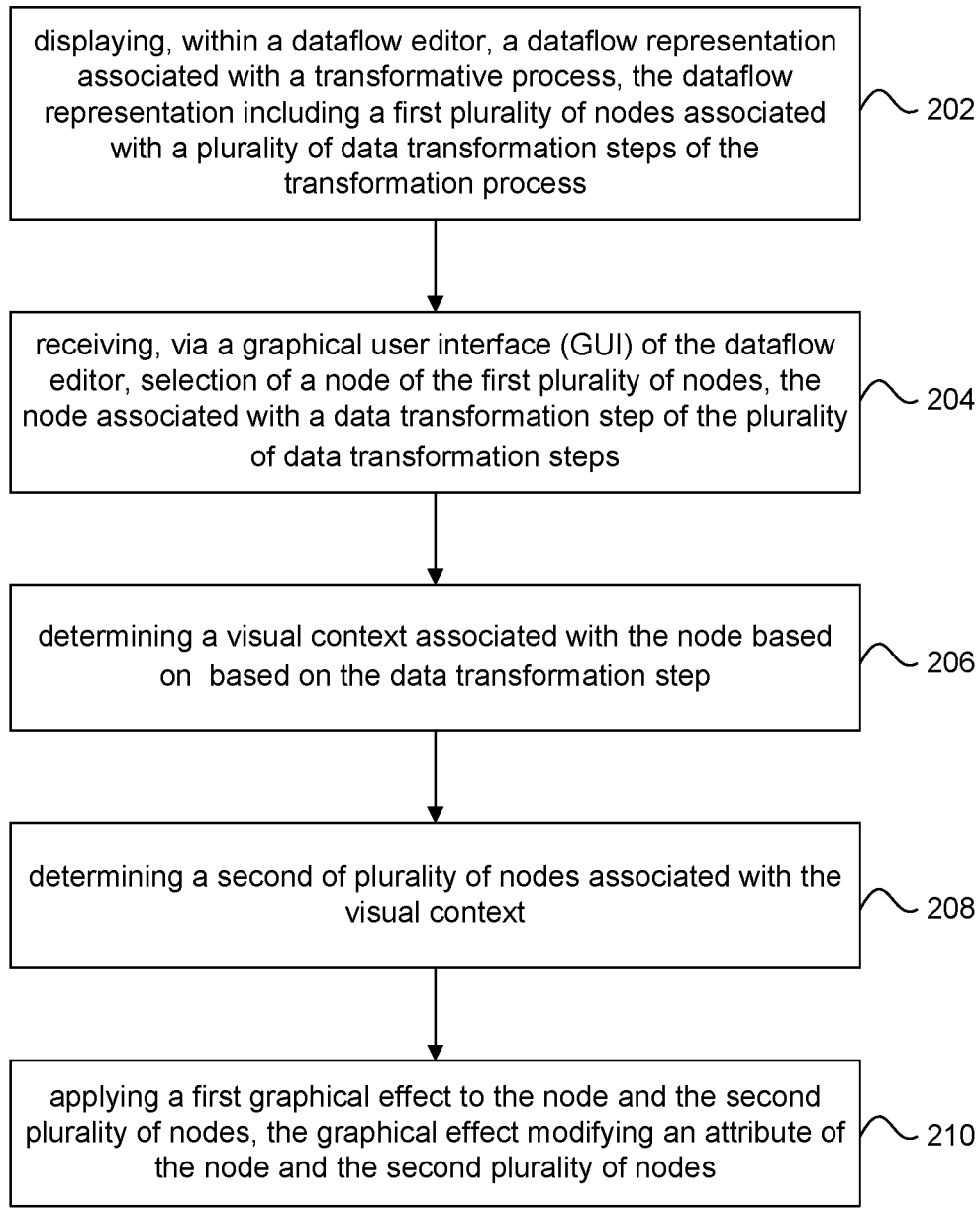
FIG. 2 illustrates an example method for implementing visual context in dataflows, according to some embodiments.

FIG. 2 illustrates a method 200 for implementing dynamic customizable animations in a multi-tenant system, according to some embodiments, according to some embodiments. Method 200 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art(s).

At 202, the computing device displays, within a dataflow editor, a dataflow representation associated with a transformative process, the dataflow representation including a first plurality of nodes, wherein an individual node of the first plurality of nodes is associated with a data transformation step of the transformative process. For example, a designer may endeavor to design the dataflow 104 to perform the following operations: (1) collect web analytics from multiple data sources, (2) transform the data to dataset formats best suited for revealing possible trends, and (3) transform the datasets to trend information. To construct the dataflow 104, the designer may add the dataflow nodes 108(1)-(N) to the dataflow 104. As an example, the designer may add the filter transformation node 108(5) configured to filter out information corresponding to website visitors outside of a particular geographic area. As illustrated in FIG. 1, once the dataflow nodes 108(1)-(N) have been added to the dataflow 104, the dataflow builder application may display the dataflow nodes 108(1)-(N) within the canvas 102.

At 204, the computing device receives, via a graphical user interface (GUI) of the dataflow editor, selection of the individual node of the first plurality of nodes. For example, the designer may select the filter transformation node 108(5) via the dataflow builder GUI 100. In some embodiments, the designer may use an input device (e.g., mouse, keyboard, touch screen display, etc.) to select the filter transformation node 108(5).

In some instances, the designer may select the filter transformation node 108(5) in order to ascertain its function within the dataflow 104. Further, in some instances, the designer may select the filter transformation node 108(5) for the purpose of viewing or modifying the processing logic of the filter transformation node 108(5). For example, the designer may endeavor to reconfigure the filter step applied by the filter transformation node 108(5) to data input to the filter transformation node 108(5) via a declarative programming interface. The designer may want to modify the input to or output from the filter transformation node 108(5), the source of the input to the filter transformation node 108(5), the destination of the output from the filter transformation node 108(5), or a condition applied by the filter process of the filter transformation node 108(5) to identify the geographic region of interest.

At 206, the computing device determines a visual context associated with the individual node based on the data transformation step. For example, the dataflow builder application may determine criteria for identifying dataflow nodes to display with the filter transformation node 108(5) within the canvas 102, and a visual layout for displaying the dataflow nodes 108 associated with the visual context. As described in detail herein, the dataflow builder application may determine the visual context based at least in part on the type of node, the type of data associated with the node, predetermined proximity information, and/or historic designer activity. In some embodiments, the visual context may include a predetermined number of dataflow nodes preceding and/or succeeding the filter transformation node 108(5). For example, the dataflow builder application may determine that the dataflow node 108(1) is a member of the visual context based on the visual context including any dataflow nodes less than four degrees away from the filter transformation node 108(5). Additionally, the context may further be determined based on the type of the filter transformation node 108(5). For example, the predetermined proximity may be all nodes less than four degrees from the filter transformation node 108(5) because the filter transformation node 108(5) corresponds to a filter transformation.

At 208, the computing device determines, from the first plurality of nodes, a second plurality of nodes associated with the visual context. For example, if the dataflow builder application determines that the visual context includes dataflow nodes within second degrees of the filter transformation node 108(5), the dataflow builder application may identify at least dataflow nodes 108(2)-(11).

At 210, the computing device applies a graphical effect to the individual node and the second plurality of nodes, the graphical effect modifying an attribute of the node and the second plurality of nodes. For example, the dataflow builder application may present the dataflow nodes 108(1)-(12) within the canvas 102, i.e., the selected dataflow node 108(5) and the dataflow nodes 108(1)-(4) and 108(6)-(12) associated with the visual context of the selected dataflow node 108(5). Further, the dataflow builder application may apply one or more graphical effects to increase the ease of visibility of the filter transformation node 108(5) and the dataflow nodes 108(1)-(4) and 108(6)-(12). In some embodiments, the dataflow builder application may magnify, re-position, or re-align the dataflow nodes 108(1)-(12) within the canvas 102. Additionally, or alternatively, the dataflow builder application may center a view of the canvas 102 over the dataflow nodes 108(1)-(12). In addition, in some embodiments, the dataflow builder application may display only the dataflow nodes 108(1)-(12) associated with the visual context.

Figure 3:
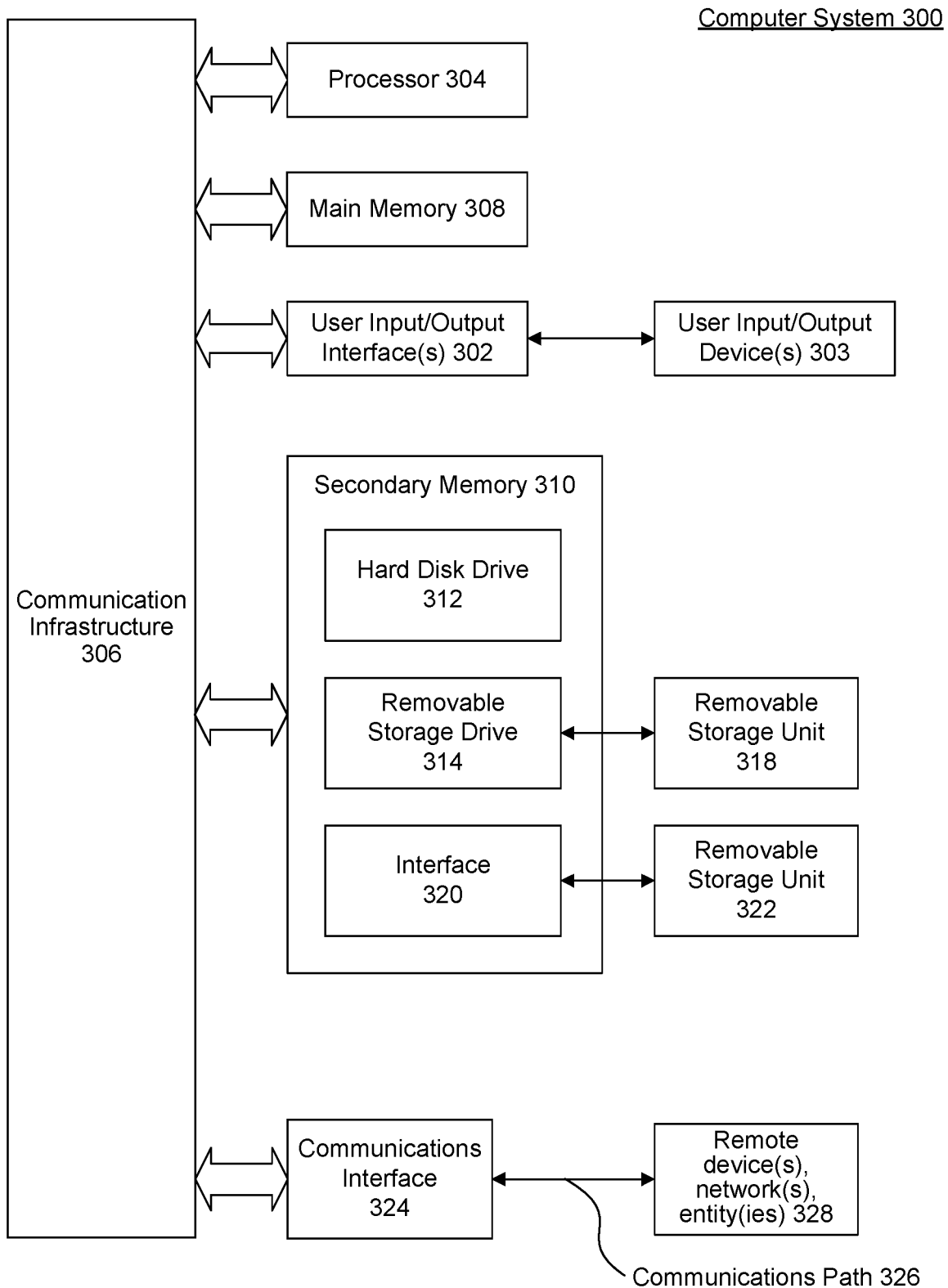
FIG. 3 illustrates a computer system, according to exemplary embodiments of the present disclosure.

FIG. 3 is an example computer system useful for implementing various embodiments. Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 302, such as monitors, keyboards, pointing devices, etc., which may communicate with communication infrastructure or bus 306 through user input/output device(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (e.g., the dataflow builder application, other computer software, etc.) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs (e.g., the dataflow builder application) and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
displaying, within a dataflow editor, a dataflow representation associated with a transformative process, the dataflow representation including a first plurality of nodes, wherein an individual node of the first plurality of nodes is associated with a data transformation step of the transformative process;
receiving, via a graphical user interface (GUI) of the dataflow editor, selection of the individual node of the first plurality of nodes;
determining a source node of the first plurality of nodes configured to provide source data used by the data transformation, and a sink node of the first plurality of nodes configured to sink data provided by the data transformation, based on the selection of the individual node;
generating a source-to-sink path from the source node to the sink node via the individual node based on the selection of the individual node;
generating a visual context comprising a second plurality of nodes of the first plurality of nodes selected based on a presence of the second plurality of nodes within the source-to-sink path; and
applying a graphical effect to the individual node and the second plurality of nodes, the graphical effect modifying an attribute of the individual node and the second plurality of nodes.

2. The method of claim 1, wherein applying the graphical effect comprises magnifying a size of the individual node and the second plurality of nodes.

3. The method of claim 1, wherein applying the graphical effect comprises centering a view of the GUI on the second plurality of nodes.

4. The method of claim 1, wherein the graphical effect is a focus effect, and further comprising:
determining, from the second plurality of nodes, a third plurality of nodes that are not associated with the visual context; and applying a de-focusing graphical effect to the third plurality of nodes.

5. The method of claim 4, wherein the de-focusing graphical effect includes removing the third plurality of nodes or graying out the third plurality of nodes.

6. The method of claim 1, wherein determining the second plurality of nodes comprises:
- determining, based at least in part on user input to the GUI, a relationship between the data transformation step and another transformation step of the transformation process; and
- determining the second plurality of nodes based at least in part on the relationship.

7. A system comprising:
a memory; and
one or more processors and/or circuits coupled to the memory and configured to:
- display, within a dataflow editor, a dataflow representation associated with a transformative process, the dataflow representation including a first plurality of nodes, wherein an individual node of the first plurality of nodes is associated with a data transformation step of the transformative process;
- receive, via a graphical user interface (GUI) of the dataflow editor, selection of the individual node of the first plurality of nodes;
- determine a source node of the first plurality of nodes configured to provide source data used by the data transformation, and a sink node of the first plurality of nodes configured to sink data provided by the data transformation, based on the selection of the individual node;
- generate a source-to-sink path from the source node to the sink node via the individual node based on the selection of the individual node;
- generate a visual context comprising a second plurality of nodes of the first plurality of nodes selected based on a presence of the second plurality of nodes within the source-to-sink path, and
- apply a graphical effect to the individual node and the second plurality of nodes, the graphical effect modifying an attribute of the individual node and the second plurality of nodes.

8. The system of claim 7, wherein to apply the graphical effect, the one or more processors and/or circuits are further configured to magnify a size of the individual node and the second plurality of nodes.

9. The system of claim 7, wherein the graphical effect includes centering a view of the GUI on the second plurality of nodes.

10. The system of claim 7, wherein the graphical effect is a focus effect, and the one or more processors and/or circuits are further configured to:
- determine, from the second plurality of nodes, a third plurality of nodes that are not associated with the visual context; and apply a de-focusing graphical effect to the third plurality of nodes.

11. The system of claim 10, wherein the de-focusing graphical effect includes removing the third plurality of nodes or graying out the third plurality of nodes.

12. A non-transitory computer-readable device having instructions stored thereon that, when executed by at least one computer, cause the at least one computer to perform operations comprising:
- displaying, within a dataflow editor, a dataflow representation associated with a transformative process, the dataflow representation including a first plurality of nodes, wherein an individual node of the first plurality of nodes is associated with a data transformation step of the transformative process;
- receiving, via a graphical user interface (GUI) of the dataflow editor, selection of the individual node of the first plurality of nodes;
- determining a source node of the first plurality of nodes configured to provide source data used by the data transformation, and a sink node of the first plurality of nodes configured to sink data provided by the data transformation, based on the selection of the individual node;
- generating a source-to-sink path from the source node to the sink node via the individual node based on the selection of the individual node;
- generating a visual context comprising a second plurality of nodes of the first plurality of nodes selected based on a presence of the second plurality of nodes within the source-to-sink path; and
- applying a graphical effect to the individual node and the second plurality of nodes, the graphical effect modifying an attribute of the individual node and the second plurality of nodes.

13. The non-transitory computer-readable device of claim 12, wherein the graphical effect is a focus effect, and the operations further comprising:
- determining, from the second plurality of nodes, a third plurality of nodes that are not associated with the visual context; and
- applying a de-focusing graphical effect to the third plurality of nodes.

14. The non-transitory computer-readable device of claim 12, wherein determining the second plurality of nodes comprises:
- determining, based at least in part on user input to the GUI, a relationship between the data transformation step and another transformation step of the transformation process; and
- determining the second plurality of nodes based at least in part on the relationship.

* * * * *